United States Patent Office 3,407,258
Patented Oct. 22, 1968

3,407,258
METHODS OF TREATING ARTERIOSCLEROTIC VERTIGO AND DEPRESSION
August Franciscus Harms, Amsterdam, Netherlands, assignor to Brocades-Stheeman & Pharmacia, Amsterdam, Netherlands, a corporation of the Netherlands
No Drawing. Continuation-in-part of application Ser. No. 268,528, Mar. 26, 1963. This application Oct. 14, 1965, Ser. No. 496,173
Claims priority, application Great Britain, Nov. 30, 1962, 45,554/62
2 Claims. (Cl. 424—339)

ABSTRACT OF THE DISCLOSURE

This invention relates to methods for treating arteriosclerotic vertigo and depression with N-methylaminoethyl-2-methylbenzhydryl ether and nontoxic acid addition salts thereof.

This is a continuation-in-part of our copending application, Ser. No. 268,528, filed Mar. 26, 1963, now abandoned.

This invention relates to an ether of 2-methylbenzhydrol, to pharmaceutical preparations in which it is contained, and to a method of treating certain disorders by its administration.

Considerable research and experimentation have been conducted in the field of aminoalkyl benzhydryl ethers, and certain of them have been found to possess useful therapeutic properties. Some tertiary-aminoalkyl benzhydryl ethers have been found to be useful as antihistaminics, others as local anaesthetics, and still others have been found to be useful, due to their strong atropine action, in the treatment of motion sickness. Nevertheless, of the large number of aminoalkyl benzhydryl ethers that have been prepared and tested by various workers, very few have been found to have useful application in human medicine.

It is the object of the present invention to provide a new secondary-aminoalkyl benzhydryl ether which possesses useful pharmacological properties which could not have been predicted from knowledge of its chemical structure.

Another object of the invention is to provide pharmaceutical preparations which contain this new ether as the active constituent.

A further object of the invention is the provision of a new method of treating disorders including arteriosclerotic vertigo and depressions.

In accordance with the present invention there is provided N-methylaminoethyl-2-methylbenzhydryl ether of the formula:

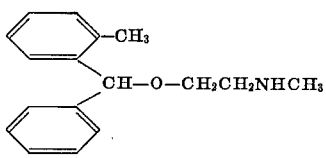

The compound of Formula I possesses as aforesaid, pharmacological properties which are useful in therapeutic application. More specifically, the new compound of the invention is effective against arteriosclerotic vertigo and further, stimulates psychiatric patients suffering from depressions. This combination of properties makes N-methylaminoethyl-2-methylbenzhydryl ether especially useful in the treatment of aged psychiatric patients. It should also be noted that although many agents have been tested for the treatment of depression which is a serious and frequently encountered affliction, until the present no completely satisfactory remedy has been found.

Moreover, N - methylaminoethyl-2-methylbenzhydryl ether may be utilized as an intermediate in the production of N,N-dialkylated derivatives among which the N,N-dimethyl compound known commercially by the trademark Disipal is of particular importance.

The monomethylamino compound of Formula I differs from previously known aminoalkyl benzhydryl ethers in which the amino group is tertiary in that it does not possess a strong atropine action, although such action is characteristic of known tertiary amino compounds.

The compound of Formula I is prepared by reacting a beta-haloethyl-2-methylbenzhydryl ether of the formula:

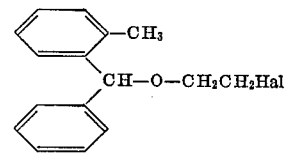

wherein Hal represents a halogen atom, preferably chlorine, with methylamine. The reaction may be carried out without a solvent for the reactants, or in water, or in an inert organic solvent medium, e.g., a monohydric alcohol such as methanol and ethanol, an alkyl ketone such as acetone, an ether such as dioxane and diethyl ether, a hydrocarbon such as benzene or a halogenated hydrocarbon such as carbon tetrachloride. The reaction takes place in the absence or presence of acid-binding agents, such as hydroxides, oxides, alcoholates, carbonates and bicarbonates of alkali metals. When no acid-binding agent is used, it is advantageous to employ two or more equivalents of methylamine for each equivalent of beta-haloethyl-2-methylbenzhydryl ether. The presence of an acid-binding agent enables smaller quantities of methylamine to be used without materially affecting the yield of the desired 2-methylbenzhydryl ether. Since methylamine has a low boiling point, it is preferable to carry out the reaction by heating the reactants in a closed vessel to prevent loss of amine from the reaction mixture.

Another suitable method for the preparation of N-methylaminoethyl-2-methylbenzhydryl is the reaction of a benzhydryl compound of the formula:

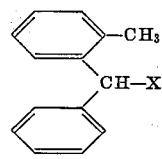

wherein X represents a halogen atom, preferably chlorine, or a hydroxyl group, with N-methylaminoethanol. When X represents a halogen atom, the reaction between the 2-methylbenzhydryl halide and the N-methylamine ethanol is advantageously carried out in the presence of a tertiary alkylamine, e.g., tributylamine, as basic condensing agent, and preferably in the presence of an inert organic solvent, e.g., a hydrocarbon such as benzene or toluene. When X in Formula III represents the hydroxyl group, the reaction between 2-methylbenzhydrol and N-methylaminoethanol is preferably carried out by heating the reactants in the presence of a dehydrating agent, such as toluene-p-sulphonic acid, and under subatmospheric pressure.

The compound of Formula I can also be prepared by demethylating beta - dimethylaminoethyl-2-methylbenzhydryl ether by methods known per se for the demethylation of methylamines, as described, for example, in Ber. 33, 1938 (1900). The demethylation can be effected, for example, by replacement of one of the methyl groups with a cyano group by treatment of the dimethylamino compound with a cyanogen halide, preferably cyanogen bromide, then hydrolysis of the resultant N-cyano-N-methylamino compound, followed by decarboxylation of the N - carboxy-N-methylaminoethyl-2-methylbenzhydryl ether thus formed.

Further, the compound of Formula I can be prepared by reducing, by methods known per se, as described for example by N. G. Gaylord, "Reduction with complex metal hydrides," page 544, Interscience Publishers Inc., New York, 1956, the carbonyl group of an amide of the formula:

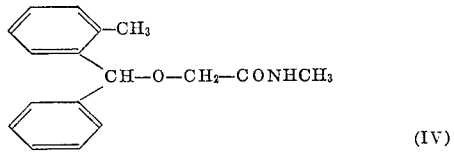

(IV)

to the methylene (i.e., —CH$_2$—) group. The reduction is preferably effected with lithium aluminium hydride. The amide of Formula IV can be obtained by reacting an alkyl ester of o-tolylphenylmethoxyacetic acid with methylamine.

Still another method for the preparation of the compound of Formula I is the debenzylation of N-benzyl-N-methylaminoethyl-2-methylbenzhydryl ether by catalytic hydrogenation. Palladium, preferably on charcoal, is the preferred hydrogenation catalyst.

Acid addition salts of N-methylaminoethyl-2-methylbenzdryl ether may be obtained in manner known per se. For example, the salts are obtainable by treatment of the base in an appropriate solvent medium, e.g., diethyl ether, with an equivalent quantity of an acid.

The term "methods known per se" as used in this specification means methods heretofore used or described in the literature.

The compound of this invention when used for therapeutic purposes may be employed as such, or in the form of a nontoxic acid addition salt, i.e., a salt which is not harmful to the animal organism when used in therapeutic doses, derived from an inorganic acid, such as the hydrohalic acids, e.g., hydrochloric and hydrobromic acids, and an organic acid such as oxalic, maleic, fumaric, citric and tartaric acids.

Pharmaceutical preparations containing N - methyl-aminoethyl-2-methylbenzhydryl ether, or nontoxic acid addition salts thereof, as the active agent, in association with a pharmacologically-acceptable carrier may take any of the forms customarily employed for administration of therapeutically active substances. Among the preferred types of pharmaceutical preparations are those suitable for oral administration and especially tablets, pills, and capsules. The tablets and pills may be formulated in manner known per se with one or more pharmacologically-acceptable diluents or excipients, such as lactose or starch, and may include materials of a lubricating nature such as calcium stearate. Capsules made of absorbable material, such as gelatine, may contain the active agent alone or in admixture with a solid or liquid diluent. The active agent may also be made up in a form suitable for parenteral administration, i.e., as a suspension or emulsion in sterile water or an organic liquid usually employed for injectable preparations, for example vegetable oil, such as olive oil, or a sterile solution in an organic solvent.

In the treatment of arteriosclerotic vertigo, 12.5 to 25 mg. of N-methylaminoethyl-2-methylbenzhydryl ether is administered three times a day. For the stimulation of psychotic patients a typical dose is 25 mg. three times a day. In general, a suitable dose of N-methylaminoethyl-2-methylbenzhydryl ether for an adult human being is 25 mg. to 250 mg. per day for both disorders. Therefore, tablets containing 25 mg. to 50 mg. of the active ingredient are useful. Grooved tablets, which can easily be divided into halves, are suitably used when the administration of a half tablet is desired.

The ratio of active material to carrier material in a tablet may be from 1:1 to 1:15. Preferred ratio's are 2:3 and 1:7.

The following examples, in which all temperatures are in degrees centigrade, are further illustrative of the invention, however, the examples should not be construed as limiting the invention in any way.

EXAMPLE I

Preparation of n-methylaminoethyl 2-methylbenzhydryl ether (A) A mixture of 51 g. of beta-chloroethyl-2-methylbenzhydryl ether and 35 g. of methylamine in 140 ml. of methanol is heated for six hours in a closed vessel at a temperature of 125–135°. After cooling, the reaction mixture is poured into water and extracted with petroleum ether (boiling range 40–60°). The ether layer is separated and washed with a 2N hydrochloric acid solution. The acidic layer is made alkaline and extracted with ether. The ethereal solution is separated and dried with sodium sulphate. After filtration, the solvent is evaporated and the residue distilled under reduced pressure. There is thus obtained 40 g. (yield 80%) of N-methylaminoethyl-2-methylbenzhydryl ether boiling at 139–143°/0.7 mm.

(B) This last-named base is dissolved in anhydrous ether, and an ethereal solution of hydrochloric acid is added to form the hydrochloride of N-methylaminoethyl-2-methylbenzhydryl ether. The salt is crystallized from a mixture of ethanol and ether. Yield 36 g. (78%); melting point 147–148°.

Analysis.—Calculated for C$_{17}$H$_{22}$ClNO: C, 69.97%; H, 7.60%; N, 4.80%. Found: C, 70.52%; H, 7.61%; N, 4.80%.

(C) Beta-chloroethyl 2-methylbenzhydryl ether, used as starting material, can be prepared as follows:

A mixture of 39.5 g. of 2-methylbenzhydrol, 200 ml. of beta-chloroethanol and 10 ml. of concentrated hydrochloric acid is boiled under reflux for 4 hours. After cooling, the reaction mixture is poured into water and extracted with petroleum ether (boiling range 40–60°). The layers are separated, and the ethereal solution dried with sodium sulphate. It is then filtered. The filtrate is concentrated by evaporation of the solvent. The residue is distilled under reduced pressure to give 51.0 g. (yield 98%) of beta-chloroethyl-2-methylbenzhydryl ether, boiling at 156–158°/2.5 mm.

EXAMPLE II 27.3 g. of o-tolylphenylmethoxyacetic acid monomethylamide, dissolved in ether, is added to a solution of 2.2 g. of lithium aluminum hydride in ether and the mixture refluxed for two hours. The excess of the reducing agent is destroyed, and the amine converted into its hydrochloride by the addition of 2 N hydrochloric acid. The acidic layer is separated and made alkaline by treatment with sodium hydroxide. The mixture is extracted with ether, and the ether layer separated and dried with sodium sulphate. After filtration, the solvent is evaporated and the residue distilled under reduced pressure to yield N-methylaminoethyl-2-methylbenzhydryl ether, boiling at 140–145°/1 mm. The free base can be converted into the hydrochloride by following the procedure described in Example I(B).

o-Tolylphenylmethoxyacetic acid monomethylamide can be prepared from 2-methylbenzhydrol in the following way:

35 g. of 2-methylbenzhydrol and 4.3 g. of sodium in xylene are allowed to stand overnight at room temperature. Then the mixture is heated at 100° for two hours. After cooling, 8.5 g. of monochloroacetic acid is added and the mixture is heated on a water bath for 20 hours. It is then cooled and extracted with 0.2 N sodium hydroxide. The alkaline solution is separated and acidified with 5 N hydrochloric acid, yielding 9 g. of o-tolylphenylmethoxyacetic acid, M.P. 101–103°. The melting point can be raised to 108–109° by further crystallizations. The substituted acetic acid is converted into its methyl ester by treatment with diazomethane in ether. The solvent and residual diazomethane is distilled off and the remaining oil is dissolved in methanol and heated with methylamine in a closed vessel. After completion of the reaction, methanol is distilled off under reduced pressure, leaving an oil from which pure o-tolylphenylmethoxyacetic acid monomethylamide is obtained by treatment with petroleum ether.

EXAMPLE III

To 5.8 g. of cyanogen bromide in 20 ml. of benzene, a solution of 13.5 g. of N,N-dimethylaminoethyl-2-methylbenzhydryl ether in 80 ml. of anhydrous benzene is added gradually with stirring. The temperature rises slightly. The mixture is refluxed for two and a half hours. After cooling, the mixture is treated with water. The benzene layer is separated and dried with sodium sulphate. After filtration and removal by distillation of the solvent, crude N-cyano-N-methylamnioethyl 2-methylbenzhydryl ether is obtained, which can be purified by recrystallization from alcohol.

To 7.0 g. of N-cyano-N-methylaminoethyl-2-methylbenzhydryl ether are added 20 g. of potassium hydroxide in 10 ml. of water and 40 ml. of alcohol. The mixture is refluxed for about 20 hours. It is then poured into water and extracted with ether. The layers are separated and the ether layer is dried and, after filtration, a solution of hydrochloric acid in anhydrous ether is added to convert the free base into its hydrochloride, which melts at 148–149° after crystallization from ethanol.

EXAMPLE IV

A mixture of 19.8 g. of 2-methylbenzhydrol, 8.25 g. of N-methylaminoethanol and 20.64 g. of toluene-p-sulphonic acid is heated at a temperature of 150° for three hours under reduced pressure. The reaction mixture is poured into water. The acidic layer together with the insoluble toluene-p-sulphonate of N-methylaminoethyl-2-methylbenzhydryl ether is made alkaline, and the resulting solution is extracted with ether. The ether layer is separated and dried with sodium sulphate. After filtration an ethereal solution of hydrochloric acid is added. The precipitated hydrochloride of N-methylaminoethyl-2-methylbenzhydryl ether is filtered off and crystallized from a mixture of alcohol and ether. Yield: 70%. Melting point 144–146°.

EXAMPLE V

A mixture of 19.8 g. of 2-methylbenzhydryl chloride, 3.75 g. of N-methylaminoethanol, and 9.25 g. of tributylamine, is dissolved in 125 ml. of toluene, and is heated under reflux for a period of 6 hours with stirring. The solvent is distilled off, and acetone and ether added to the cooled residue. The hydrochloride of N-methylaminoethyl-2-methylbenzhydryl ether precipitates and is filtered off. The melting point of the crude product, 129–137°, can be raised to 144–145° by crystallization from a mixture of ethanol and ether. Yield: 84%.

EXAMPLE VI

Pharmaceutical preparations containing N-methylaminoethyl 2-methylbenzhydryl ether Coated tablets containing 50 mg. of N-methylaminoethyl-2-methylbenzhydryl ether are prepared as follows:

Ingredients: Kg.
 N-methylaminoethyl-2-methylbenzhydryl ether __ 20
 Sugar (sucrose) _____ 8
 Milk sugar _____ 8
 Starch _____ 8
 Talc _____ 4
 Stearic acid _____ 2

The above-specified quantities of N-methylaminoethyl-2-methylbenzhydryl ether, sugar, milk sugar, starch and talc are mixed in a conventional mixer and run through a tabletting machine to make as large and dense a tablet as possible. The tablets are reduced to granules of a size of about 25-mesh in an oscillating granulator or dry mill. The granules are thoroughly mixed with the stearic acid and compressed into tablets weighing 125 mg. The tablets are then transferred into a coating pan and there coated in the usual manner.

EXAMPLE VII

In the same manner as set forth in Example VI, 200 mg. tablets are prepared, each containing:

Mg.
N-methylaminoethyl-2-methylbenzhydryl ether _____ 25
Milk sugar _____ 132
Starch _____ 33
Magnesium stearate _____ 2
Talc _____ 8

What I claim and desire to secure by Letters Patent is:
1. A method of treating arteriosclerotic vertigo, which comprises administering an effective amount of a compound selected from the group consisting of N-methylaminoethyl-2-methylbenzhydryl ether and non-toxic acid addition salts thereof to a patient suffering from such.
2. A method of treating depression, which comprises administering an effective amount of N-methylaminoethyl-2-methylbenzhydryl ether to a patient suffering from such.

References Cited

FOREIGN PATENTS 220,619  4/1962  Austria.

OTHER REFERENCES

Harms et al.: "Proc. Soc. Exptl. Biol. Med.," vol. 108, pages 57–77 (1960).

ALBERT T. MEYERS, *Primary Examiner.*

S. FRIEDMAN, *Assistant Examiner.*